: US 6,287,449 B1
: Sep. 11, 2001

United States Patent
Horie et al.

(54) METHOD OF ELECTROLYTIC TEXTURING AND ELECTROLYTIC LIQUID SLURRY

(75) Inventors: Yuji Horie; Jun Watanabe, both of Tokyo (JP)

(73) Assignee: Nihon Micro Coating Co., Ltd. (JP)

( * ) Notice: Subject to any disclaimer, the term of this patent is extended or adjusted under 35 U.S.C. 154(b) by 0 days.

(21) Appl. No.: 09/440,968

(22) Filed: Nov. 16, 1999

(51) Int. Cl.$^7$ ...................................................... B23H 3/00
(52) U.S. Cl. ............................ 205/668; 205/672; 205/674
(58) Field of Search ................................... 205/662, 668, 205/672, 674

(56) References Cited

FOREIGN PATENT DOCUMENTS 11-144240 * 5/1999 (JP) .

* cited by examiner

Primary Examiner—Kathryn Gorgos
Assistant Examiner—Thomas H Parsons
(74) Attorney, Agent, or Firm—Coudert Brothers

(57) ABSTRACT

An electrolytic liquid slurry containing pure water, abrading particles and nitric acid, boric acid, alkanol amine, sodium sulfite, sodium chloride, ammonium chloride, sodium phosphate, potassium phosphate, sodium silicate, aluminum phosphate, ammonium phosphate, diethanolamide borate, amine borate, sodium metaborate, propylene glycol or their liquid mixture is supplied to the surface of a magnetic hard disk substrate or the surface of a tape. The tape is pressed against the surface of the disk substrate and a voltage difference is applied between an electrode disposed in contact with the electrolytic liquid slurry and the disk substrate which serves as another electrode. Since texturing and electrolytic processes are thus carried out simultaneously, the stock removal can be increased and the throughput can be improved.

14 Claims, 1 Drawing Sheet

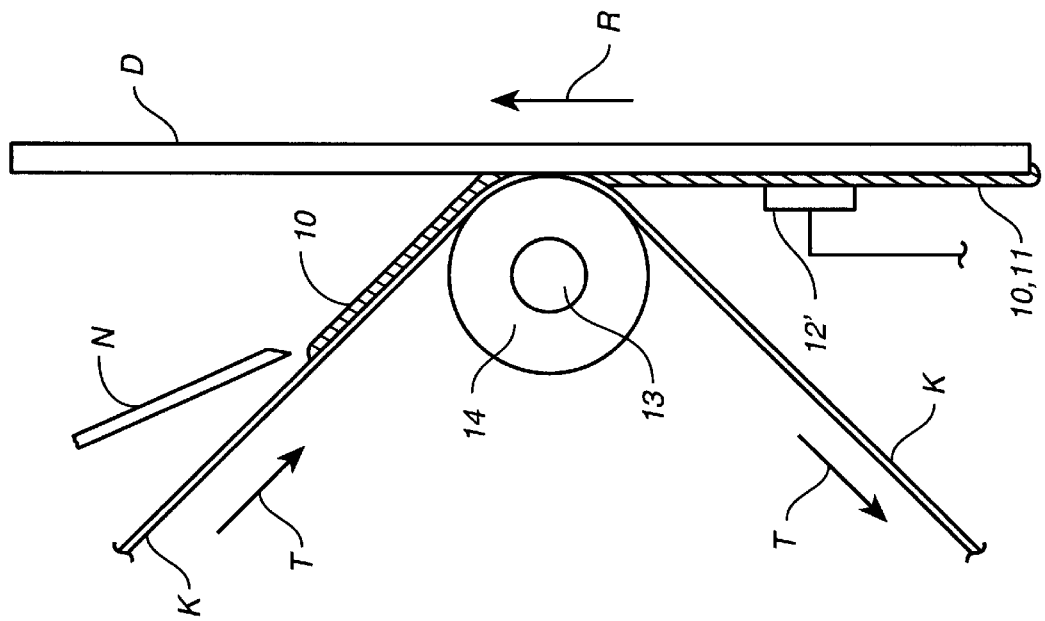
FIG._1b
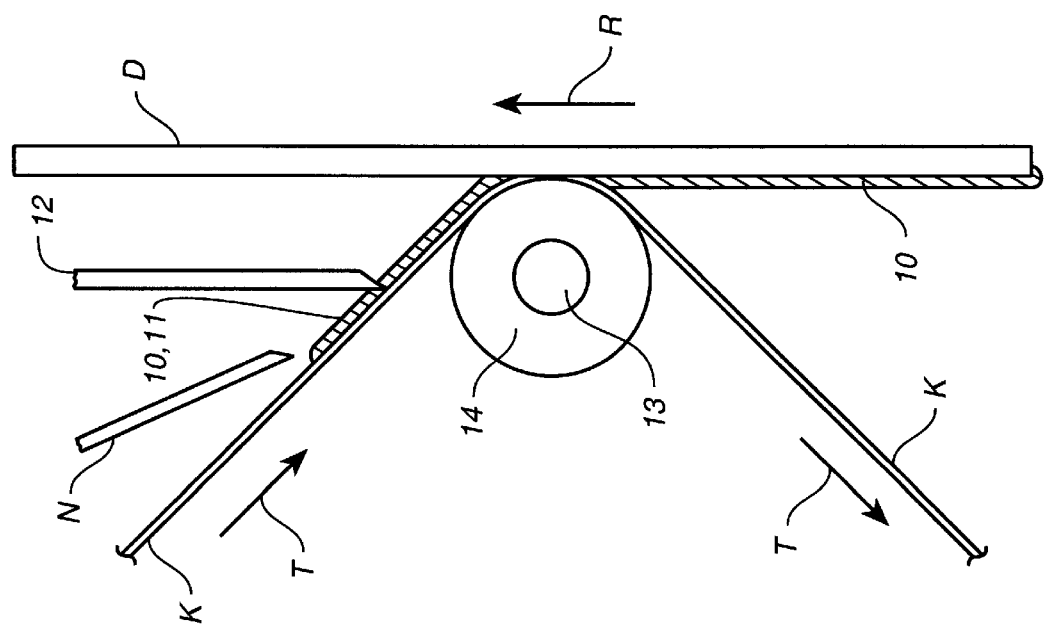
FIG._1a

METHOD OF ELECTROLYTIC TEXTURING AND ELECTROLYTIC LIQUID SLURRY

BACKGROUND OF THE INVENTION

1. Field of the Invention

This invention relates to a method of electrolytic texturing whereby an electrolytic liquid is used for the texturing, say, of the surface of a magnetic hard disk substrate. The invention also relates to an electronic liquid slurry which may be used in such a texturing method.

2. Description of the Related Art

The recent trend has been to increase the memory capacity of magnetic hard disks, and there has been an increased demand to store data at higher densities. As a result, it has become necessary to reduce and stabilize the floating distance of a magnetic head from a magnetic hard disk to less than about 0.15 μm and the texturing on the surface of the magnetic hard disk is required to be carried out more finely and uniformly than before without forming any abnormal protrusions on the textured surface.

In response to the recent increase in the demand for magnetic hard disks, furthermore, there has also been an increased demand for reducing the time required for the surface texturing of the magnetic hard disk substrates so as to increase their throughput. It is also being desired to increase the stock removal, that is, the amount of the material scraped off the textured surface of the magnetic hard disk substrate.

In order to reduce the abnormal protrusions which may be found formed on a magnetic hard disk surface after a texturing process, electrolytic texturing processes whereby the surface of a magnetic hard disk substrate is electrolytically treated with an electrolytic liquid and the abnormal protrusions formed thereon are removed by etching are currently being considered. In an electrolytic texturing process, an electrolytic liquid is mixed with a liquid slurry serving as free abrading particles to obtain an electrolytic liquid slurry, and the surface texturing of a magnetic hard disk substrate is carried out while the electrolytic liquid slurry thus obtained is supplied onto the surface and the aforementioned electrolytic treatment is carried out thereon. In order to increase the electrical conductivity of the electrolytic liquid, however, use is made of a liquid with a very high acidity. As a result, there arises the problem that the surface of the magnetic hard disk surface tends to be etched excessively. Another problem that arises if the electrolytic liquid is strongly acid is that the mixture of the electrolytic liquid and the liquid slurry serving as free abrading particles tends to become separated and hence that it is difficult to produce a stable electrolytic liquid slurry. Still another problem is that a strongly acid electrolytic liquid tends to corrode the apparatus for the texturing process.

SUMMARY OF THE INVENTION

It is therefore an object of this invention to provide a very weakly acid and nearly neutral electrolytic liquid slurry for the surface texturing of a magnetic hard disk substrate and a method of electrolytic texturing using such a liquid slurry.

Stated more particularly, it is an object of this invention to provide such an electrolytic liquid slurry with which the stock removal can be increased and the throughput can be improved, as well as a method using such a liquid slurry.

An electrolytic liquid slurry to be used according to this invention may be characterized as containing, in addition to pure water and abrading particles, nitric acid, boric acid, alkanol amine, sodium sulfite, sodium chloride, ammonium chloride, sodium phosphate, potassium phosphate, sodium silicate, aluminum phosphate, ammonium phosphate, diethanolamide borate, amine borate, sodium metaborate, propylene glycol or a liquid mixture thereof. It may further contain phosphoric acid, oxalic acid, chromic acid, sulfuric acid, hydrochloric acid or a liquid mixture thereof. A method of electrolytic texturing embodying this invention is characterized by the steps of supplying such an electrolytic liquid slurry to the surface of a magnetic hard disk substrate, pressing an abrading tape for the texturing against this substrate surface, positioning an electrode such that the electrolytic liquid slurry is sandwiched between it and the magnetic hard disk substrate which is to serve as another electrode, and applying a voltage difference, say, of about 0.5V–30V, between the electrode and the magnetic hard disk substrate. In using this method, the electrode may be positioned so as to contact a liquid membrane formed on the contact surface of the tape by the electrolytic liquid slurry which has been dropped onto the tape surface. Alternatively, the electrode may be positioned so as to contact a liquid membrane formed on the surface of the magnetic hard disk substrate by the electrolytic liquid slurry supplied thereonto.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1(a) is a sketch of a texturing machine which may use a method according to this invention; and FIG. 1 (b) is a sketch of another texturing machine which may use a method according to this invention.

DETAILED DESCRIPTION OF THE INVENTION

As summarized above, the present invention is characterized by the use of an electrolytic liquid slurry containing, in addition to pure water and abrading particles, nitric acid, boric acid, alkanol amine, sodium sulfite, sodium chloride, ammonium chloride, sodium phosphate, potassium phosphate, sodium silicate, aluminum phosphate, ammonium phosphate, diethanolamide borate, amine borate, sodium metaborate, propylene glycol or a liquid mixture thereof. In order to improve its electrical conductivity, it may further contain a strong acid such as phosphoric acid, oxalic acid, chromic acid, sulfuric acid and hydrochloric acid or a liquid mixture thereof. Although such a strong acid may be additionally contained, the electrolytic liquid slurry according to this invention is only weakly acid as a whole. Examples of the abrading particles to be contained include diamond powder and aluminum oxide powder particles.

FIGS. 1(a) and 1(b) show texturing machines which may be used for texturing the surface of a magnetic hard disk substrate by using a method of this invention, including a rubber roller 14 which is rotatable around a bearing 13 and a nozzle N through which an electrolytic liquid slurry 10 is supplied to the surface of a magnetic hard disk substrate D. There is also provided an electrode 12 (or 12') connected to a power source (not shown), disposed in such a way that the electrolytic liquid slurry 10 is sandwiched between this electrode 12 (or 12') and the magnetic hard disk substrate D which is used to serve as a second electrode.

Texturing of the magnetic hard disk substrate D is effected by adjusting the pressure of the rubber roller 14 in pressing a tape K against the surface of the magnetic hard disk substrate D, causing the tape K to travel in the direction indicated by arrow T and the magnetic hard disk substrate D to rotate in the direction indicated by arrow R, and applying a voltage difference between the electrode 12 (or 12') and the magnetic hard disk substrate D through a shaft for fastening the disk substrate D for effecting electrolysis.

FIG. 1(a) shows an embodiment according to which the electrolytic liquid slurry 10 is dropped in the meantime directly from the nozzle N to the surface of the tape K and is moved by gravity as well as by the motion of the tape K to reach the surface of the disk substrate D, thereby forming a liquid membrane 11 on the surface of the tape K. The tape K may be a woven cloth of plastic fibers such as polyethylene terephthalate fibers, one obtained therefrom by planting plastic fiber piles on the surface, a foamed polyurethane tape having a foamed polyurethane layer on the surface of a base material, a cloth tape or a non-woven cloth tape. In order to have the liquid membrane 11 of the electrolytic liquid slurry 10 dependably on the surface of the tape K, it is preferable that the tape K have piles of a material such as nylon with thickness 0.1–3.0 deniers and length 0.2–1.0 mm planted on the surface of a plastic base material such as a polyethylene terephthalate film with thickness 10–100 $\mu$m. The electrode 12 (in the form of an elongated bar as shown in FIG. 1(a)) is disposed so as to contact the liquid membrane 11 of the electrolytic liquid slurry 10 formed on the surface of the tape K. With the electrode 12 thus positioned, the electrolytic liquid slurry 10 is sandwiched between this electrode 12 and the disk substrate D serving as a second electrode. An electrolytic process is carried out by applying a voltage difference between the electrode 12 and the disk substrate D serving as the second electrode. Concurrently with this electrolytic process, a texturing process is effected on the surface of the disk substrate D over the contact surface between the disk substrate D and the tape K. By this texturing process, abnormally high protrusions formed on the substrate surface are etched away by the electrolysis on the surface of the disk substrate D. After thus contributing to the surface texturing of the disk substrate D, the electrolytic liquid slurry 10 is discharged away from the disk surface both by the centrifugal force due to the rotation of the disk substrate D and by gravity.

FIG. 1(b) shows another embodiment according to which the electrolytic liquid slurry 10, dropped onto the surface of the tape K, is moved by gravity as well as by the motion of the tape K to reach the surface of the disk substrate D, and the texturing of the substrate surface is carried out over the contact surface across which the tape K and the surface of the disk substrate D are pressed against each other. The liquid slurry 10, which participates in the surface texturing of the disk substrate D, is moved radially outward due both to the gravitational force and to the centrifugal force of the rotation of the disk substrate D and forms a liquid membrane 11 on the surface of the disk substrate D. A planar electrode 12' is positioned so as to contact this liquid membrane 11 formed on the surface of the disk substrate D and to have the liquid slurry 10 sandwiched between this planar electrode 12' and the disk substrate D itself which now serves as another electrode. Thus, as a voltage difference is applied between the electrode 12' and the disk substrate D, an electrolytic process is carried out on the surface of the disk substrate D. As a result of this electrolytic process, abnormally high protrusions which were formed on the surface of the disk substrate D by the texturing process over the contact surface between the tape K and the disk substrate D are etched away. After thus contributing to the electrolytic treatment, the electrolytic liquid slurry 10 is discharged away by both the gravitational force and the centrifugal force of the rotation of the disk substrate D.

Although FIG. 1(b) shows an embodiment according to which the electrolytic liquid slurry 10 is dropped directly onto the surface of the tape K, the electrolytic liquid slurry 10 may be dropped somewhere near the contact surface between the tape K and the disk substrate D or directly onto the surface of the disk substrate D. The voltage difference to be applied between the extended electrode 12 in the shape of a bar as shown in FIG. 1(a) or the planar electrode 12' as shown in FIG. 1(b) and the disk substrate D serving as the other electrode is in the range of 0.5V–30V. The voltage to be applied may be a DC voltage such that the disk substrate D serves as the positive electrode for carrying out a DC electrolysis or may be an AC voltage for carrying out an AC electrolysis.

In order to demonstrate the merits of the invention, the invention is described next by way of test and comparison experiments which have been carried out.

Test Experiment 1

An electrolytic liquid slurry embodying this invention was prepared by mixing together 5 weight % of a liquid dispersion with the composition shown in Table 1, 0.20 weight % of diamond powder #6000 serving as abrading particles and 94.8 weight % of pure water. For the electrolytic texturing process, use was made of a tape produced by uniformly planting nylon piles of thickness 0.5 deniers and length 0.4 mm by a so-called flocking process on the surface of a polyethylene terephthalate film of thickness 50 $\mu$m. The so-called flocking process is one wherein one of a mutually oppositely disposed pair of planar electrodes is grounded, piles are places on the side of this grounded electrode, and a plastic film coated with a binder adhesive such as an acryl resin is run on the other electrode to which is applied a high voltage such that the piles will fly to the surface of the film and become planted thereon along the lines of the electrostatic field between the electrodes. It is a convenient method, capable of planting piles uniformly and perpendicularly to the surface of a plastic film at a high density.

A magnetic hard disk substrate made of an aluminum plate, subjected to a Ni—P plating and polished for finishing was used for the experiment. A texturing machine as shown in FIG. 1(a) was used for the texturing of this disk substrate by rotating the disk substrate at 95 rpm, pressing the tape to the surface of the disk substrate with an inner pressure force (applied near the center of the disk substrate) of 1.0 kg and an outer pressure force (applied near the periphery of the disk substrate) of 1.2 kg through a rubber roller with hardness 40 degrees, causing the tape to travel at a speed of 150 mm/min while undergoing vibrations in a transverse direction (that is, a radial direction of the disk substrate) with amplitude of 1mm and frequency of 150 vibrations/min, and dropping the electrolytic liquid slurry described above at a rate of 4 ml/min onto the surface of the tape. A DC voltage of 5V was applied between the bar-shaped electrode and the disk substrate serving as the positive electrode. The texturing was continued for 15 seconds. The tape was caused to vibrate in the radial direction of the disk substrate in order to prevent any sudden changes in surface roughness on the disk substrate such that a constant floating distance of a magnetic head can be assured.

Test Experiment 2

Another electrolytic liquid slurry embodying this invention was prepared by adding 1 weight % of phosphoric acid showing the characteristics of a strong acid to 10 weight % of the liquid slurry prepared in Test Experiment 1 and further adding 89 weight % of pure water. The pH value of this liquid slurry was 7.54 (weakly acid) and its electrical conductivity was 12.15 ms/cm.

Comparison Experiments 1 and 2

In order to make comparisons with the electrolytic texturing in Test Experiment 1, Comparison Experiments 1 and 2 were carried out as follows.

For Comparison Experiment 1, 22.2 weight % of a liquid dispersion with the composition shown in Table 2, 0.2 weight % of diamond powder #6000 and 77.6 weight % of pure water were mixed together to obtain a liquid slurry and 3 weight % of phosphoric acid was further added to 97 weight % of this liquid slurry to produce an electrolytic liquid slurry. An electrolytic texturing process was carried out by using this electrolytic liquid slurry but otherwise under the same conditions as in Test Experiment 1.

For Comparison Experiment 2, 22.2 weight % of a liquid dispersion with the composition shown in Table 2, 0.2 weight % of diamond powder #6000 and 77.6 weight % of pure water were mixed together to obtain a liquid slurry. A texturing process was carried out by using this liquid slurry and without applying any voltage but otherwise under the same conditions as in Test Experiment 1.

The measured values of average surface roughness (Ra), maximum height of protrusion (Rp) and stock removal obtained in Test Experiment 1 and Comparison Experiments 1 and 2, obtained by using a probe need with 0.2 $\mu$mR (Model P-1 produced by Tencol, Inc.), are shown in Table 3. Table 3 clearly shows that the values of Ra and Rp by Test Experiment 1 were smaller than those obtained in Comparison Experiments 1 and 2, indicating that finer and more uniform texturing was done in Test Experiment 1. It is also seen that the stock removal per unit time was greater in Test Experiment 1 than in Comparison Experiments 1 and 2, indicating that the time required for texturing was shorter in the case of Test Experiment 1.

In summary, methods according to this invention have the following merits. Firstly, since the electrolytic liquid slurry according to this invention is weakly acid, there is no liquid separation in the slurry. Secondly, the surface of a disk substrate is not excessively etched by the electrolysis on the surface and hence the substrate surface can be finely and uniformly textured. Thirdly, texturing and electrolytic processes can be carried out at the same time without corroding the texturing machine if an electrolytic liquid slurry of this invention is used. Fourthly, the throughput can be increased by a method according to this invention because the texturing and electrolytic processes can be carried out simultaneously.

TABLE 1

| Component | Weight % |
| --- | --- |
| alkanol amine | 10.0 |
| boric acid | 6.5 |
| sodium metaborate | 5.0 |
| propylene glycol | 10.0 |
| nitric acid | 8.5 |
| pure water | 20.0 |

TABLE 2

| Component | Weight % |
| --- | --- |
| higher aliphatic acid | 10.0 |
| glycol | 80.0 |
| anionic surfactant | 10.0 |

TABLE 3

| | Ra (Å) | Rp (Å) | Stock Removal ($\mu$m) |
| --- | --- | --- | --- |
| Test Exp. 1 | 26 | 123 | 1.83 |
| Comparison Exp. 1 | 38 | 187 | 1.10 |
| Comparison Exp. 2 | 40 | 228 | 0.50 |

What is claimed is:

1. A method of electrolytic texturing of a surface of a magnetic hard disk substrate, said method comprising the steps of:

supplying an electrolytic liquid slurry to said surface, said electrolytic liquid slurry containing abrading particles, pure water and one selected from the group consisting of nitric acid, boric acid, alkanol amine, sodium sulfite, sodium chloride, ammonium chloride, sodium phosphate, potassium phosphate, sodium silicate, aluminum phosphate, ammonium phosphate, diethanolamide borate, amine borate, sodium metaborate, propylene glycol and liquid mixtures thereof;

pressing a tape for texturing on said surface;

positioning an electrode such that said electrolytic liquid slurry is sandwiched between said electrode and said magnetic hard disk substrate; and applying a voltage difference across said electrode and said magnetic hard disk substrate.

2. The method of claim 1 wherein said electrolytic liquid slurry further contains an acid selected from the group consisting of phosphoric acid, oxalic acid, chromic acid, sulfuric acid, hydrochloric acid and liquid mixtures thereof.

3. The method of claim 2 wherein said voltage difference is 0.5V–30V.

4. The method of claim 1 wherein said voltage difference is 0.5V–30V.

5. A method of electrolytic texturing of a surface of a magnetic hard disk substrate, said method comprising the steps of:

pressing a tape for texturing on said surface;

supplying an electrolytic liquid slurry to said surface by dropping said electrolytic liquid slurry onto said tape to thereby form a liquid membrane with said electrolytic liquid slurry on said tape, said liquid membrane continuing to reach said surface, said electrolytic liquid slurry containing abrading particles, pure water and one selected from the group consisting of nitric acid, boric acid, alkanol amine, sodium sulfite, sodium chloride, ammonium chloride, sodium phosphate, potassium phosphate, sodium silicate, aluminum phosphate, ammonium phosphate, diethanolamide borate, amine borate, sodium metaborate, propylene glycol and liquid mixtures thereof;

positioning an electrode such that said electrolytic liquid slurry is sandwiched between said electrode and said magnetic hard disk substrate; and applying a voltage difference across said electrode and said magnetic hard disk substrate.

6. The method of claim 5 wherein said electrolytic liquid slurry further contains an acid selected from the group consisting of phosphoric acid, oxalic acid, chromic acid, sulfuric acid, hydrochloric acid and liquid mixtures thereof.

7. The method of claim 6 wherein said voltage difference is 0.5V–30V.

8. The method of claim 5 wherein said voltage difference is 0.5V–30V.

9. A method of electrolytic texturing of a surface of a magnetic hard disk substrate, said method comprising the steps of:

supplying an electrolytic liquid slurry to said surface and thereby forming a liquid membrane of said electrolytic liquid slurry on said surface, said electrolytic liquid slurry containing abrading particles, pure water and one selected from the group consisting of nitric acid, boric acid, alkanol amine, sodium sulfite, sodium chloride, ammonium chloride, sodium phosphate, potassium phosphate, sodium silicate, aluminum phosphate, ammonium phosphate, boric acid diethanolamide borate, amine borate, sodium metaborate, propylene glycol and liquid mixtures thereof;

pressing a tape for texturing on said surface;

positioning an electrode so as to contact said liquid membrane; and applying a voltage difference across said electrode and said magnetic hard disk substrate.

10. The method of claim 9 wherein said electrolytic liquid slurry further contains an acid selected from the group consisting of phosphoric acid, oxalic acid, chromic acid, sulfuric acid, hydrochloric acid and liquid mixtures thereof.

11. The method of claim 10 wherein said voltage difference is 0.5V–30V.

12. The method of claim 9 wherein said voltage difference is 0.5V–30V.

13. An electrolytic liquid slurry comprising abrading particles, pure water and one selected from the group consisting of nitric acid, boric acid, alkanol amine, sodium sulfite, sodium chloride, ammonium chloride, sodium phosphate, potassium phosphate, sodium silicate, aluminum phosphate, ammonium phosphate, diethanolamide borate, amine borate, sodium metaborate, propylene glycol and liquid mixtures thereof, said electrolytic liquid slurry serving as free abrading particles when used in an electrolytic texturing process for a surface of a magnetic hard disk substrate.

14. The electrolytic liquid slurry of claim 13 further comprising an acid selected from the group consisting of phosphoric acid, oxalic acid, chromic acid, sulfuric acid, hydrochloric acid and liquid mixtures thereof.

* * * * *